(12) United States Patent
Billings et al.

(10) Patent No.: US 9,650,902 B2
(45) Date of Patent: May 16, 2017

(54) INTEGRAL FAN BLADE WEAR PAD AND PLATFORM SEAL

(71) Applicant: United Technologies Corporation, Hartford, CT (US)

(72) Inventors: Scott C. Billings, Marlborough, CT (US); James O. Hansen, Glastonbury, CT (US); Michael A. Weisse, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1364 days.

(21) Appl. No.: 13/739,218

(22) Filed: Jan. 11, 2013

(65) Prior Publication Data
US 2014/0286781 A1    Sep. 25, 2014

(51) Int. Cl.
*F01D 5/30* (2006.01)
*F01D 11/00* (2006.01)

(52) U.S. Cl.
CPC ......... *F01D 5/3007* (2013.01); *F01D 5/3092* (2013.01); *F01D 11/008* (2013.01); *F05D 2220/36* (2013.01); *Y02T 50/673* (2013.01)

(58) Field of Classification Search
CPC .... F01D 5/3007; F01D 5/3015; F01D 5/3092; F01D 11/005; F01D 11/006; F01D 11/008; F05D 2220/36; F05D 2300/43; F05D 2300/431; F05D 2300/433
See application file for complete search history.

(56) References Cited

U.S. PATENT DOCUMENTS

| | | | | |
|---|---|---|---|---|
| 2,819,870 A * | 1/1958 | Wayne | .................. | F01D 5/3076 416/248 |
| 2,936,155 A * | 5/1960 | Howell | ..................... | F01D 5/22 416/134 R |
| 2,967,043 A * | 1/1961 | Dennis | ..................... | F01D 5/147 416/193 A |
| 3,640,640 A * | 2/1972 | Palfreyman | ............... | F01D 5/30 415/9 |
| 3,712,757 A * | 1/1973 | Goodwin | .............. | F01D 11/008 416/193 R |
| 4,019,832 A * | 4/1977 | Salemme | .............. | F01D 11/008 416/135 |
| 4,045,149 A * | 8/1977 | Ravenhall | ................. | F01D 5/30 416/135 |

(Continued)

OTHER PUBLICATIONS

U.S. Appl. No. 13/488,968, "Assembled Blade Platform," filed on Jun. 5, 2012.

(Continued)

*Primary Examiner* — Ninh H Nguyen
*Assistant Examiner* — Wayne A Lambert
(74) *Attorney, Agent, or Firm* — Carlson, Gaskey & Olds, P.C.

(57) ABSTRACT

A fan section for a gas turbine engine includes a fan hub having a slot. A platform is supported by the fan hub. A fan blade has a root that is received in the slot. A wear pad is provided between the fan hub and the root and includes a flap integral with the wear pad to provide a seal relative to the platform. A fan blade for a gas turbine engine includes an airfoil extending from a root. A wear pad is secured to the root and has a free end providing a flap canted toward the root.

18 Claims, 3 Drawing Sheets

(56) References Cited

U.S. PATENT DOCUMENTS

| | | | | |
|---|---|---|---|---|
| 4,183,720 A * | 1/1980 | Brantley | F01D 11/008 | 416/193 A |
| 4,343,593 A * | 8/1982 | Harris | F01D 5/282 | 416/193 A |
| 4,417,854 A * | 11/1983 | Cain | F01D 5/284 | 416/219 R |
| 4,802,824 A * | 2/1989 | Gastebois | F01D 5/282 | 416/193 A |
| 5,160,243 A * | 11/1992 | Herzner | F01D 5/28 | 416/220 R |
| 5,275,536 A * | 1/1994 | Stephens | F01D 5/26 | 416/193 A |
| 5,277,548 A * | 1/1994 | Klein | F01D 11/008 | 29/889.21 |
| 5,464,326 A * | 11/1995 | Knott | F01D 11/008 | 416/193 A |
| 5,573,377 A * | 11/1996 | Bond | F01D 5/147 | 416/219 R |
| 5,791,877 A * | 8/1998 | Stenneler | F01D 5/22 | 416/204 A |
| 5,890,874 A * | 4/1999 | Lambert | F01D 11/008 | 416/193 A |
| 5,935,360 A | 8/1999 | Griggs | | |
| 6,004,101 A * | 12/1999 | Schilling | F01D 5/28 | 416/219 R |
| 6,074,706 A * | 6/2000 | Beverley | C23C 28/00 | 29/527.3 |
| 6,202,273 B1 * | 3/2001 | Watts | F01D 5/3007 | 29/243.56 |
| 6,290,466 B1 | 9/2001 | Ravenhall et al. | | |
| 6,332,490 B1 | 12/2001 | Griggs | | |
| 6,736,602 B2 | 5/2004 | Carney | | |
| 6,832,896 B1 * | 12/2004 | Goga | F01D 5/3007 | 416/191 |
| 8,066,479 B2 * | 11/2011 | El-Aini | F01D 11/008 | 416/1 |
| 8,475,695 B2 * | 7/2013 | Carper | C04B 35/565 | 264/258 |
| 8,535,013 B2 * | 9/2013 | Care | F01D 11/008 | 416/212 A |
| 9,017,032 B2 * | 4/2015 | Mason | F04D 29/322 | 416/193 A |
| 9,017,033 B2 * | 4/2015 | Brown | F01D 5/147 | 416/193 A |
| 9,145,784 B2 * | 9/2015 | Evans | F01D 5/3092 | |
| 2002/0141869 A1 * | 10/2002 | Lee | F01D 5/183 | 416/97 R |
| 2003/0152797 A1 * | 8/2003 | Darolia | C23C 14/08 | 428/633 |
| 2007/0280831 A1 * | 12/2007 | Pickens | F01D 5/3038 | 416/220 R |
| 2008/0232969 A1 * | 9/2008 | Brault | F01D 5/22 | 416/219 R |
| 2012/0082551 A1 * | 4/2012 | Macchia | F01D 5/3092 | 416/219 R |
| 2012/0082559 A1 * | 4/2012 | Guglielmin | B82Y 30/00 | 416/241 R |
| 2013/0266447 A1 * | 10/2013 | Evans | F01D 5/225 | 416/191 |
| 2013/0302170 A1 * | 11/2013 | Booze | F01D 5/3092 | 416/219 R |
| 2013/0302173 A1 * | 11/2013 | Booze | F01D 5/282 | 416/230 |
| 2014/0212292 A1 * | 7/2014 | Xu | F01D 5/30 | 416/193 A |

OTHER PUBLICATIONS

U.S. Appl. No. 13/471,718, "Detachable Fan Blade Platform and Method of Repairing Same," filed on May 15, 2012.

U.S. Appl. No. 13/605,237, "Fan Blade Platform Flap Seal," filed Sep. 6, 2012.

* cited by examiner

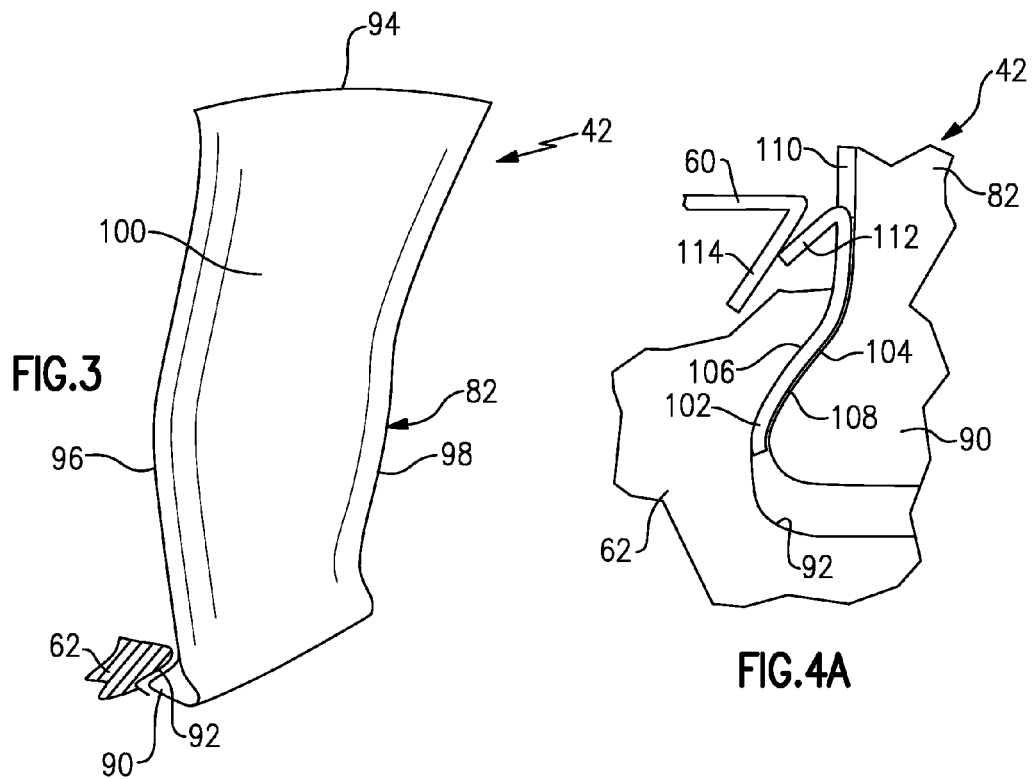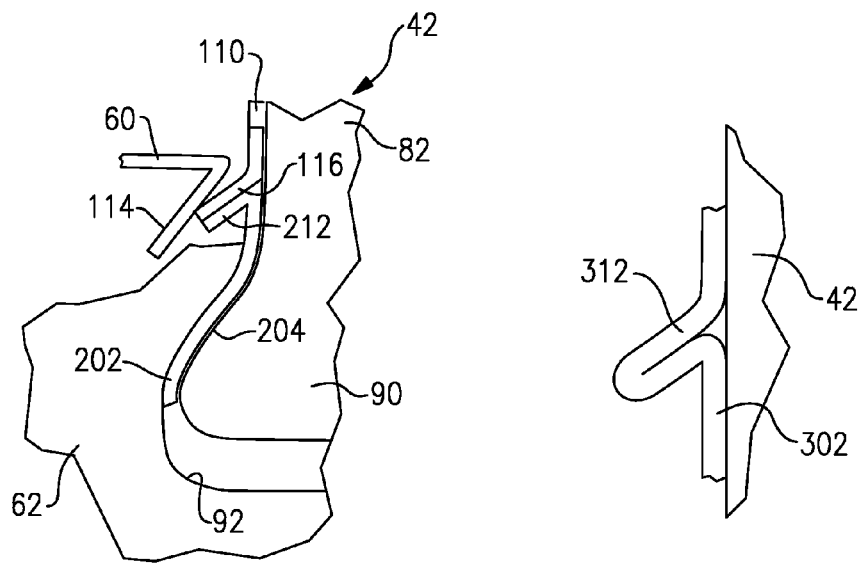

US 9,650,902 B2

INTEGRAL FAN BLADE WEAR PAD AND PLATFORM SEAL

BACKGROUND

This disclosure relates to a fan blade for a gas turbine engine. More particularly, the application relates to a seal arrangement for the fan section inner flow path surface.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large fan blades. One type of fan section utilizes platforms between adjacent fan blades that are supported by a fan hub to which the fan blades are also secured. Typically, the platforms include seals adhered to platform walls adjacent to the fan blades' exterior airfoil surface. The seals obstruct a gap between the platform and the fan blade to provide a more aerodynamic inner flow path surface by eliminating leakage at the fan blade-platform interface.

One type of fan blade is constructed from an aluminum alloy. The fan blades are received in a fan hub that may be constructed of a titanium material. During operation, the fan blade roots may rub within its slot in the fan hub. To prevent wear at the fan blade root/fan hub slot interface, a molybdenum or lead paste has been applied to the root. Some configurations may instead include a wear pad secured to the root.

SUMMARY

In one exemplary embodiment, a fan section for a gas turbine engine includes a fan hub having a slot. A platform is supported by the fan hub. A fan blade has a root that is received in the slot. A wear pad is provided between the fan hub and the root and includes a flap integral with the wear pad to provide a seal relative to the platform.

In a further embodiment of any of the above, a coating is provided on the airfoil that adjoins the flap.

In a further embodiment of any of the above, the flap seals against the platform.

In a further embodiment of any of the above, the fan section includes a second flap secured to the fan blade and adjoining the flap. The secondary flap seals against the platform.

In a further embodiment of any of the above, a coating provided on the airfoil adjoins the secondary flap.

In a further embodiment of any of the above, the wear pad and flap are an elastomeric material.

In a further embodiment of any of the above, the wear pad is provided by a fabric weave.

In a further embodiment of any of the above, the fabric weave is provided by a meta-aramid modified nylon material.

In a further embodiment of any of the above, the fan blade is an aluminum alloy.

In a further embodiment of any of the above, the fan hub is a titanium alloy.

In a further embodiment of any of the above, the fan section includes an epoxy adhesive that secures the wear pad to the fan blade.

In another exemplary embodiment, a fan blade for a gas turbine engine includes an airfoil extending from a root. A wear pad is secured to the root and has a free end providing a flap canted toward the root.

In a further embodiment of any of the above, a coating provided on the airfoil adjoins the flap.

In a further embodiment of any of the above, the fan blade includes a second flap secured to the fan blade and adjoins the flap.

In a further embodiment of any of the above, a coating provided on the airfoil adjoins the secondary flap.

In a further embodiment of any of the above, the wear pad and flap are an elastomeric material.

In a further embodiment of any of the above, the wear pad is provided by a fabric weave.

In a further embodiment of any of the above, the fabric weave is provided by a meta-aramid modified nylon material.

In a further embodiment of any of the above, the fan blade is an aluminum alloy.

In a further embodiment of any of the above, the fan blade includes an epoxy adhesive securing the wear pad to the fan blade.

BRIEF DESCRIPTION OF THE DRAWINGS

The disclosure can be further understood by reference to the following detailed description when considered in connection with the accompanying drawings wherein:

FIG. 3 is a perspective view of an example fan blade for the gas turbine engine of FIG. 1.

FIG. 4A is an end view of the fan blade root arranged in a fan hub and including a wear pad and a flap seal.

FIG. 4B is another example arrangement of a wear pad and a flap seal.

FIG. 4C is another example wear pad and flap seal.

DETAILED DESCRIPTION

Figure 1:
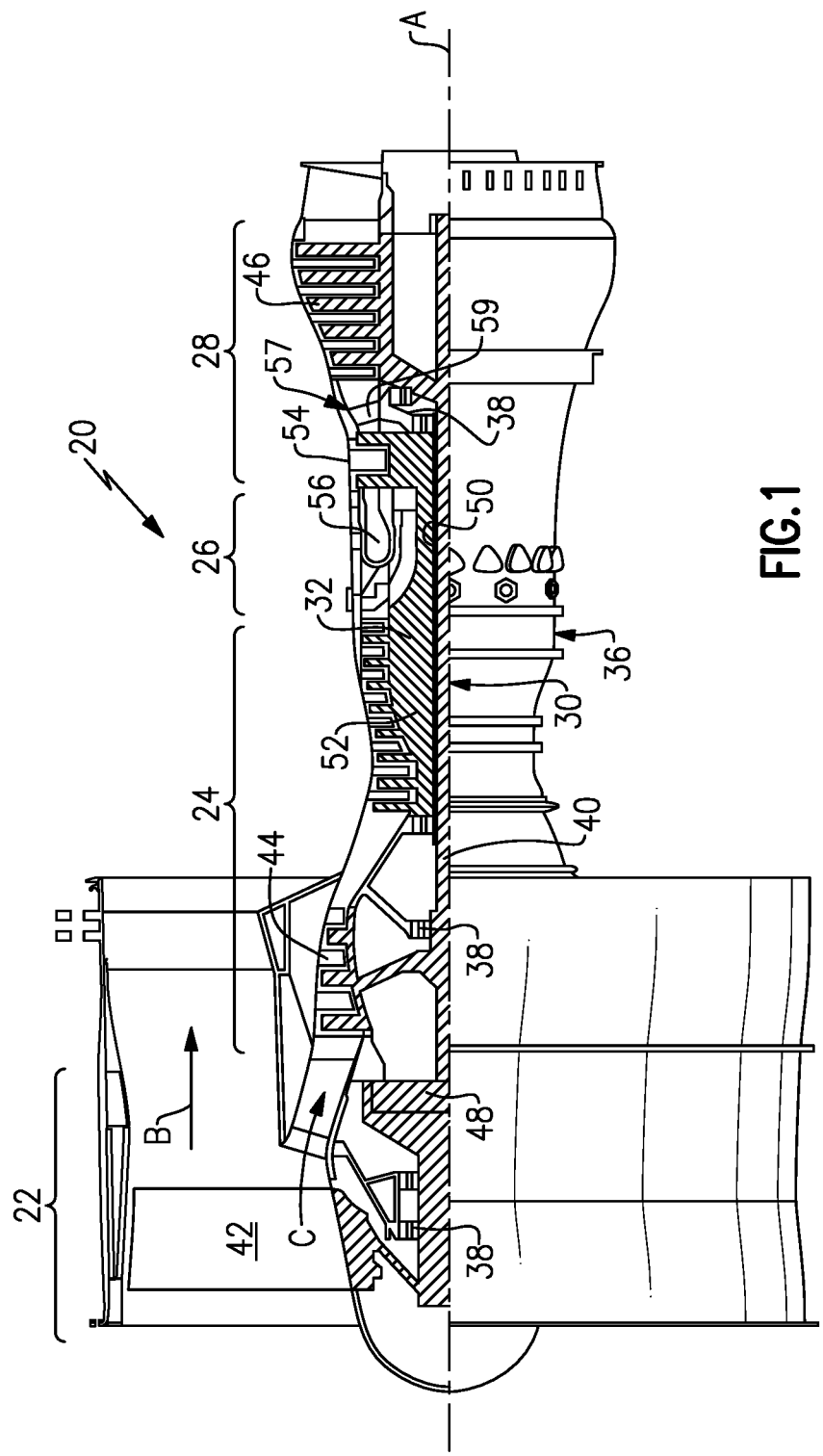
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram °R})/(518.7°\text{R})]^{0.5}$. The "Low corrected fan tip speed", as disclosed herein according to one non-limiting embodiment, is less than about 1150 ft/second.

Figure 2A:
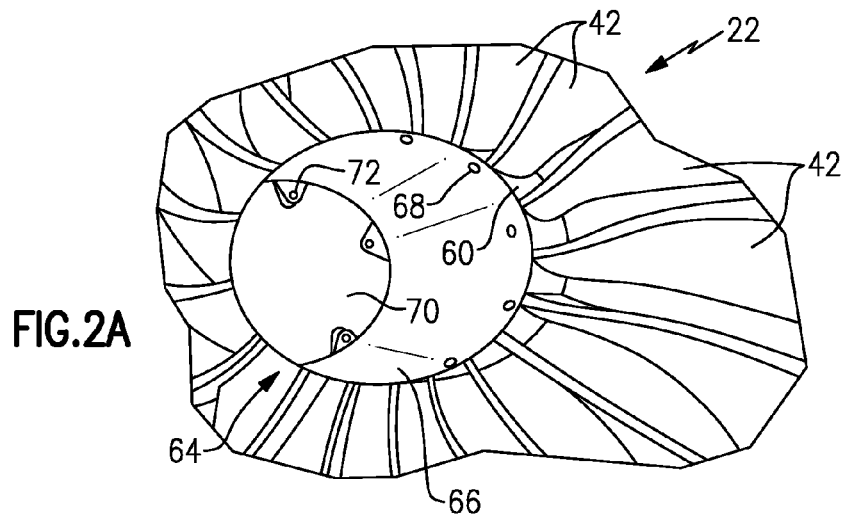
FIG. 2A is a perspective view of a portion of a fan section having fan blades and discrete platforms.
Figure 2B:
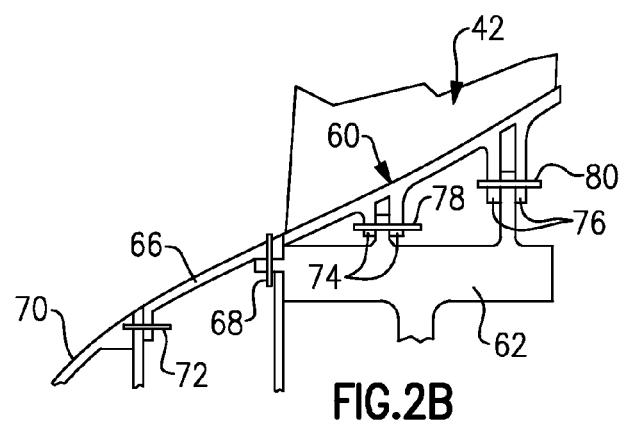
FIG. 2B is a schematic cross-sectional view through a portion of the fan section shown in FIG. 2A.
Figure 2C:
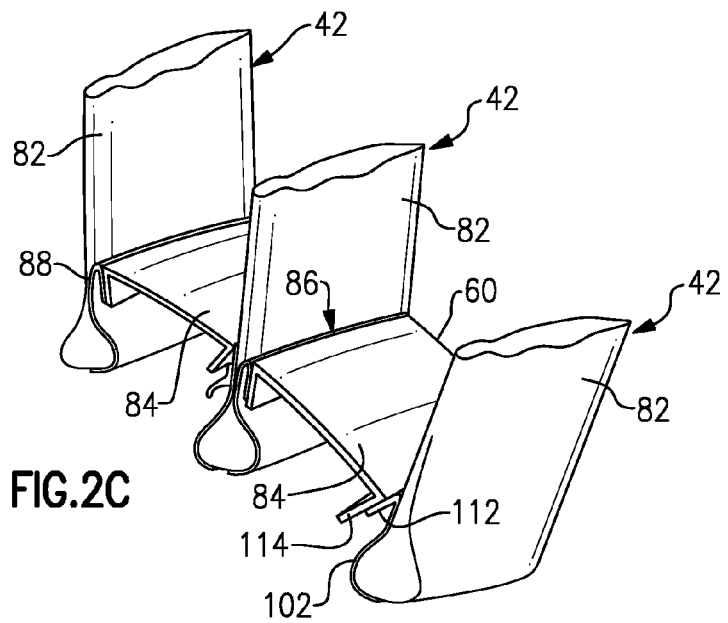
FIG. 2C is a schematic perspective view of the fan section with the nose cone removed.

The fan section 22 is shown in more detail in FIGS. 2A-2C. The fan section 22 includes multiple circumferentially arranged fan blades 42. The fan blades 42 include non-integral, discrete platforms 60, or spacers, arranged between adjacent fan blades 42. Referring to FIGS. 2A and 2B, the fan blades 42 are mounted to a fan hub 62. A nose cone 64 is arranged forward of the fan blades 42 to provide an aerodynamic inner flowpath through the fan section 22 along with the platforms 60. The nose cone 64 is provided by a spinner 66 secured to the fan hub 62 by fasteners 68. A cap 70 is secured to the spinner 66 by fasteners 72.

Referring to FIG. 2B, the platform 60 includes first and second flanges 74, 76 secured to corresponding attachment features on the fan hub 62 respectively by fasteners 78, 80. The fasteners 68, 72, 78, 80 are schematically depicted in FIG. 2B by simple, thickened lines for clarity.

Referring to FIG. 2C, each fan blade 42 has an airfoil 82. Each platform 60 has an outer surface 84, which together form a ring with the other platforms 60, spaced about axis A to provide an aerodynamic inner flow path surface. Though close fitting, a circumferential gap 86 exists between each platform outer surface 84 and an adjacent fan blade 42. Each gap 86 is blocked with a seal to minimize a loss of airflow through the gas turbine engine 10.

Referring to FIG. 3, the fan blade 42 is illustrated having a root 90 received in a correspondingly shaped slot 92 of the fan hub 62. In one example, the fan blade 42 is an aluminum alloy and the fan hub 62 is a titanium alloy. The fan blade 42 includes an airfoil 82 extending from the root 90 to a tip 94. The airfoil 82 extends from leading and trailing edges 96, 98 and spaced apart pressure and suction sides to provide an exterior surface 100. In the example, the fan blade 42 is "platformless" in that it lacks a platform extending circumferentially from the base of the airfoil. Instead, the discrete platforms 60 are used, which are sealed to improve the aerodynamic efficiency of the fan section 22.

FIG. 4A illustrates a wear pad 102 secured to a root 90 by an adhesive 104. The wear pad 102 minimizes wear of the root 90 as the fan blade 42 moves relative to the fan hub 62 during normal engine operation. The wear pad 102 may extend axially along the length of the root 90 as a continuous structure. Alternatively, the wear pad 102 may be segmented along the root's length, which enables the wear pad 102 to better conform to the root contour. In one example, the adhesive 104 is an epoxy adhesive, which may be 0.005-0.010 inch (0.13-0.25 mm) thick, for example. The wear pad 102 may be of a fabric weave constructed of a meta-aramid modified nylon material, such as a Nomex®, or a polytetrafluoroethylene, such as Teflon®. In one example, the wear pad 102 is provided by a material available from DuPont under the tradename Vespel®. In one example, the fabric may include both Teflon® and Nomex® fibers, or filaments in a phenolic resin. The wear pad 102 is approximately 0.015 inch (0.38 mm) thick in one example.

The wear pad 102 includes a free end providing a flap 112, which is integral with the wear pad 102 in the example illustrated in FIG. 4A. The wear pad 102 includes first and second sides 106, 108, which respectively engage the fan hub 62 within the slot 92 and the root 90 of the fan blade 42. The flap 112 is canted toward the root 90 and engages a wall 114 of the platform 60 to provide a seal, best shown in FIG. 2C. A protective coating 110, such as a polyurethane layer, covers the airfoil 82 and adjoins the flap 112.

In another example illustrated in FIG. 4B, a secondary flap seal 116, discrete from the wear pad 202, adjoins the flap 212. The secondary flap seal 116 is adhered to the fan blade 42 with adhesive 204 and may be constructed from an elastomeric material, such as a silicone rubber. The protective coating 110 adjoins the secondary flap seal 116. The secondary flap seal 116 engages the wall 114.

FIG. 4C depicts an integrated wear pad 302 and flap seal 312 in which the flap seal is provided as a fold. Such an arrangement may provide improved bonding to the fan blade 42.

Although an example embodiment has been disclosed, a worker of ordinary skill in this art would recognize that certain modifications would come within the scope of the claims. For that reason, the following claims should be studied to determine their true scope and content.

What is claimed is:

1. A fan section for a gas turbine engine comprising;
a fan hub having a slot;
a platform supported by the fan hub;
a fan blade having a root received in the slot; and
a wear pad provided between the fan hub and the root and adhered to the root, and including a flap integral with the wear pad to provide a seal relative to the platform; and
a secondary flap adhered to the fan blade and adjoining the flap, the secondary flap sealing against the platform.

2. The fan section according to claim 1, wherein the flap seals against the platform.

3. The fan section according to claim 1, wherein a coating provided on the airfoil adjoins the secondary flap.

4. The fan section according to claim 1, wherein the wear pad and flap are an elastomeric material.

5. The fan section according to claim 4, wherein the wear pad is provided by a fabric weave.

6. The fan section according to claim 5, wherein the fabric weave is provided by a meta-aramid modified nylon material.

7. The fan section according to claim 1, wherein the fan blade is an aluminum alloy.

8. The fan section according to claim 7, wherein the fan hub is a titanium alloy.

9. The fan section according to claim 1, comprising an epoxy adhesive securing the wear pad to the fan blade.

10. The fan section according to claim 1, wherein a fold joins the flap and the secondary flap.

11. A fan blade for a gas turbine engine comprising:
an airfoil extending from a root;
a wear pad adhered the root and having a free end providing a flap canted toward the root; and
a secondary flap adhered to the fan blade and adjoining the flap.

12. The fan blade according to claim 11, wherein a coating provided on the airfoil adjoins the secondary flap.

13. The fan blade according to claim 11, wherein the wear pad and flap are an elastomeric material.

14. The fan blade according to claim 13, wherein the wear pad is provided by a fabric weave.

15. The fan blade according to claim 14, wherein the fabric weave is provided by a meta-aramid modified nylon material.

16. The fan blade according to claim 11, wherein the fan blade is an aluminum alloy.

17. The fan blade according to claim 11, comprising an epoxy adhesive securing the wear pad to the fan blade.

18. The fan blade according to claim 11, wherein a fold joins the flap and the secondary flap.

* * * * *